Dec. 17, 1940.   C. C. HERSKIND   2,225,341
ELECTRIC VALVE CONVERTING APPARATUS
Filed Sept. 16, 1939
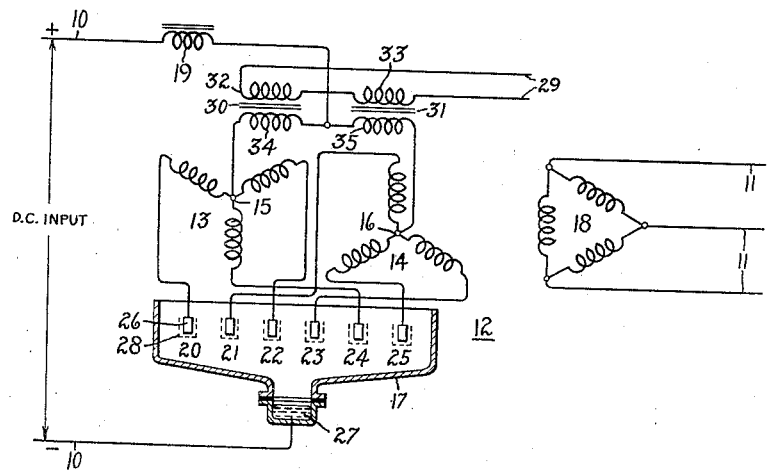
Inventor:
Carl C. Herskind,
by Harry E. Dunham
His Attorney.

Patented Dec. 17, 1940

2,225,341

UNITED STATES PATENT OFFICE 2,225,341

ELECTRIC VALVE CONVERTING APPARATUS

Carl C. Herskind, Schenectady, N. Y., assignor to General Electric Company, a corporation of New York Application September 16, 1939, Serial No. 295,319

8 Claims. (Cl. 175—363)

My invention relates to electric converting apparatus and more particularly to such apparatus adapted to transmit energy between direct and alternating current circuits.

Heretofore there have been devised numerous apparatus including electric valves for transmitting energy between direct and alternating current circuits or alternating current circuits of different frequencies. When operating such apparatus as a rectifier transmitting energy from an alternating current circuit to a direct current circuit it has been customary to control the average voltage of the direct current circuit by retarding the phase of the grid potentials of the several electric valves with respect to their anode potentials. The effect of this type of control is to draw a lagging current from the alternating current circuit while on the other hand it is usually preferable to draw a leading current in order to improve the power factor of the system. In the majority of the arrangements of the prior art, however, it has not been possible to operate such a controlled rectifier at leading power factor since this type of operation is bound to transfer the load current from one valve to the next succeeding valve in opposition to the electromotive force of the inductive windings interconnecting the valves. On the other hand, when operating such apparatus as an inverter transmitting energy from a direct current circuit to an alternating current circuit it has not been possible ordinarily to supply a lagging load on the alternating current circuit without the provision of an inordinate amount of commutating capacitance. This is due to the fact that a lagging power factor on the alternating current circuit corresponds to a transfer of load between the several electric valves at points in the cycle of alternating potential when the counter-electromotive force of the inductive windings connected between the valves opposes such commutation. The same principles apply when transmitting energy from an alternating current circuit of one frequency to an alternating current of another frequency or the same frequency. In many cases, however, it is desirable to supply a lagging power factor alternating current load by means of an electric valve converting apparatus.

In United States Letters Patent No. 1,929,725, granted October 10, 1933, upon an application of Clodius H. Willis, there is disclosed an electric valve converting apparatus by means of which energy may be transmitted in either direction between direct and alternating current circuits at any desired power factor on the alternating current circuit by introducing into the system an alternating potential which is a harmonic of that of the alternating current system. By means of this harmonic potential it is possible to force commutation from anode to anode whether the system is operating as a rectifier or as an inverter at a time during the cycle when the anode potentials would oppose such commutation.

In the arrangements of the prior art, however, this harmonic commutating potential is introduced into the power circuit and an appreciable amount of this power was required thus decreasing the efficiency of the apparatus and furthermore adversely affecting the wave form of the potential of the alternating current circuit. My invention therefore relates to an improved electric valve converting apparatus of the type disclosed in the above mentioned patent, but I provide an arrangement where an appreciable amount of commutating current flows only during the commutation period and yet where the full potential of the harmonic source is available to force commutation thereby improving the wave form and increasing the efficiency.

It is an object of my invention, therefore, to provide a new and improved electric valve converting apparatus.

It is another object of my invention to provide a new and improved electric valve converting apparatus for transmitting energy between a direct current circuit and an alternating current circuit under any desired power factor conditions on the alternating current circuit.

It is a further object of my invention to provide an improved electric valve converting apparatus by means of which energy may be transmitted from a direct current supply circuit to a lagging power factor alternating current load circuit.

It is another object of my invention to provide an improved electric valve converting apparatus utilizing a source of harmonic potential in order to force commutation wherein a minimum amount of power from said source of harmonic current is utilized.

In accordance with the illustrated embodiment of my invention, I provide an electric translating apparatus for interconnecting an alternating current circuit comprising a network of inductive windings and a plurality of electric discharge valves. The several electric valves are successively rendered alternately conductive and nonconductive and the current is transferred between successive valves under any desired power factor conditions on the alternating current circuit at points in the cycle when the fundamental alternating potential of the inductive winding or windings connecting these successive valves opposes commutation by introducing into the system an alternating potential which is a harmonic of the potential of the alternating current circuit. The harmonic potential is introduced into the electric valve converting apparatus circuit by means of a pair of transformers so constructed and arranged that a substantial amount of power from said source of harmonic potential flows only during the commutating period and during the remaining portion of the cycle little or no power is required from said source of harmonic potential, while at the same time substantially the full amount of the harmonic potential is available at all times to force commutation at any desired power factor condition on the alternating current circuit.

The novel features which I believe to be characteristic of my invention are set forth with particularity in the appended claims. My invention itself, however, will best be understood by reference to the following description taken in connection with the accompanying drawing in which the single figure thereof diagrammatically represents an embodiment of my invention.

Referring now to the single figure of the drawing, I have illustrated therein a system embodying my invention for transmitting energy from a direct current supply circuit 10 to a three phase alternating current load circuit 11. Although I shall specifically describe an electric valve converting apparatus embodying my invention operating as an inverter for transmitting energy from a direct current circuit 10 to an alternating current circuit 11, it will be understood by those skilled in the art that my invention may be equally well applied to a rectifier circuit where energy is transferred from an alternating current circuit to a direct current circuit, and also to an electric valve converting apparatus where energy is transmitted between two alternating current circuits of like or different frequency. The system illustrated in the single figure of the drawing comprises a main power transformer 12 the secondary winding of which comprises an inductive network including a pair of Y-connected windings 13 and 14 electrically displaced from one another and provided with neutral terminals 15 and 16, respectively. Windings 13 and 14 are connected across said direct current circuit 10 through an electric discharge device 17. Transformer 12 also comprises a primary winding 18 connected to the polyphase alternating current circuit 11. If desired, a smoothing reactor 19 may be connected in the direct current circuit. Electric discharge device 17 is illustrated as comprising a plurality of discharge paths 20 to 25, inclusive. A plurality of anodes 26 which are connected to the terminals of Y-connected secondary windings 13 and 14 of transformer 12 are provided, one each of which is associated with the discharge paths 20 to 25, inclusive. Also associated with discharge paths 20 to 25 is a single cathode 27 and a plurality of control electrodes or grids 28. The cathode 27 of electric discharge device 17 is connected to one side of direct current circuit 10. By way of example I have illustrated electric discharge device 17 as comprising a plurality of anodes 26 and control electrodes or grids 28 all contained within an envelope having a single cathode 27. It will of course be understood by those skilled in the art that a plurality of individual electric discharge devices each having a single anode, cathode and control grid may be utilized. Furthermore, any of the several types of electric discharge valves well known in the art may be used although I prefer to use valves of the vapor electric discharge type.

As will be well understood by those skilled in the art, the electric valve inverter thus far described will, without some special provision, supply only loads having a leading power factor from which a commutating potential may be obtained to force the current to commutate from one anode to another. In order to force this commutation from anode to anode when the apparatus is supplying other than leading loads I provide an alternating potential from a suitable source 29 which is a harmonic of the potential of alternating current circuit 11. In the particular embodiment shown where alternating current circuit 11 has three phases, the source of harmonic potential is preferably one providing a third harmonic relative to alternating current circuit 11. In order to introduce this harmonic potential into the power circuit of the electric valve converting apparatus I provide a pair of commutating transformers 30 and 31 having their respective primary windings 32 and 33 connected in series relation across the source of harmonic potential 29. The secondary winding 34 of commutating transformer 30 is connected to the neutral terminal 15 of Y-connected secondary winding 13 while the other terminal thereof is connected to the positive terminal of the direct current circuit 10. Similarly, secondary winding 35 of commutating transformer 31 has one terminal thereof connected to the neutral terminal 16 of Y-connected secondary winding 14 while the other terminal thereof is also connected to the positive terminal of the direct current circuit 10. The secondary windings 34 and 35 of commutating transformers 30 and 31 are connected in parallel relation in so far as the direct current circuit 10 is concerned.

Although I have described alternating current circuit 11 as a three phase circuit supplied from a six phase inverter circuit, it will be understood by those skilled in the art that my invention may be equally well applied to an electric valve converting apparatus wherein the alternating current circuit has more or less than three phases and where the electric valve apparatus has more or less than six phases.

Neglecting the harmonic excitation of the system, the general principles of operation of the above-described electric valve converting apparatus will be well understood by those skilled in the art. When the apparatus is operating as an inverter energy will be transmitted from direct current circuit 10 to alternating current circuit 11 through one of the discharge paths 20 to 25 of electric discharge device 17. Since Y-connected secondary windings 13 and 14 of main power transformer 12 are electrically displaced from one another by 180 electrical degrees, current will be successively transferred at 60 electrical degree intervals between the various discharge paths 20 to 25. If, for example, electric discharge path 20 associated with secondary winding 13 is rendered conductive then 60 electrical degrees later discharge path 21 associated with secondary winding 14 is rendered conductive assuming that particular phase rotation. Thus secondary windings 13 and 14 alternately carry the load current and only during the commutating interval do both these windings carry current at the same time. Any of the excitation circuits well known to those skilled in the art may be provided for control electrodes or grids so as to control the conductivity of the electric discharge paths 20 to 25 and render them conductive at the desired time. In order to force the current to commutate from discharge path 20 to discharge path 21 for example, a harmonic potential from source 29 is introduced into the circuit including commutating transformers 30 and 31. Assuming for example, that electric discharge path 20 is conducting all of the current, then commutation transformer 30 has its secondary winding 34 short circuited due to the passage of load current through windings 34 and 13 and discharge path 20. The secondary winding 35 of commutation transformer 31 on the other hand, is open circuited since none of the discharge paths 21, 23 or 25 associated with secondary winding 14 of main power transformer 12 are conducting current. As a result commutation transformer 30 whose secondary winding 34 is short circuited affords little or no impedance to harmonic commutating current flowing from source 29. Transformer 31 on the other hand, due to its open circuited secondary 35, affords a very high impedance to harmonic commutating current flowing from source 29. Therefore, only a very small amount of current may flow through primary windings 32 and 33 whenever one of the respective secondary windings 34 or 35 is open circuited. Furthermore, substantially all of the harmonic voltage from source 29 appears across the secondary winding 35 of commutation transformer 31 so as to be available for forcing commutation when anode 21, for example, is rendered conductive. Sixty electrical degrees after discharge path 20 was rendered conductive the control electrode 28 associated with discharge path 21 has a potential applied thereto from any suitable control circuit so as to render discharge path 21 conductive. By virtue of the harmonic commutating potential, which while discharge path 20 alone was conducting substantially all appeared across secondary winding 35 of commutating transformer 31, a circulating current is caused to flow causing commutation to take place by transferring the load current from discharge path 20 to discharge path 21. Since during the commutation period both secondary windings 34 and 35 of commutation transformers 30 and 31 are short circuited a large harmonic current will flow from source 29. However, upon the completion of the transfer of current from discharge path 20 to discharge path 21 secondary winding 34 of commutation transformer 30 is open circuited and therefore a very high impedance is afforded to the harmonic current flowing from source 29 to its magnitude is very small. Also substantially all of the harmonic potential appears across secondary winding 34 of commutation transformer 30 so as to force commutation to discharge path 22 when its associated grid renders it conductive. Thus it is seen that by this arrangement when only one of the transformer secondary windings 34 or 35 of commutation transformers 30 or 31 is short circuited a high impedance will be afforded to harmonic current flowing through the circuit including the respective primary windings 32 and 33 of commutation transformers 30 and 31 so that very little current will flow and little power is required. The only time that a large harmonic current will flow from the source of harmonic potential 29 is during the commutation period when both secondary windings 34 and 35 of commutating transformers 30 and 31 are short circuited so that a very low impedance is afforded to the current flowing through the primary windings 32 and 33 of these transformers. Since the commutation period is normally only a very small portion of the cycle of the alternating current voltage, it means that a more substantial saving in power supplied from the source of harmonic potential is obtained than if the full amount of commutating current is continually flowing as in the prior art devices. By this arrangement commutation from anode to anode may be effected at any part of the alternating potential wave, it being only necessary to furnish sufficient commutating voltage. It will be understood by those skilled in the art that the harmonic voltage for effecting commutation may be supplied from any of the means well known in the art, such as harmonic generators and the like. In the particular embodiment disclosed in the drawing where a third harmonic alternating potential is required, such harmonic potential may be obtained from a tertiary or open delta winding inductively associated with the main power transformer.

While I have described what I at present consider the preferred embodiment of my invention, it will be obvious to those skilled in the art that various changes and modifications may be made without departing from my invention, and I, therefore aim in the appended claims to cover all such changes and modifications as fall within the true spirit and scope of my invention.

What I claim as new and desire to secure by Letters Patent of the United States is:

1. In an electric valve converting apparatus, a load circuit, a supply circuit, one of said circuits being an alternating current circuit, means for transmitting energy between said circuits comprising a plurality of electric discharge valves and a transformer associated therewith, means for commutating the current between said electric discharge valves including a source of alternating potential which is a harmonic of the potential of said alternating current circuit, and means for limiting the flow of current from said source of harmonic potential at all times except during commutation intervals.

2. In an electric valve converting apparatus, a direct current circuit, an alternating current circuit, a transformer and a plurality of associated discharge valves interconnecting said circuits, means for commutating the current between said electric discharge valves comprising a source of alternating potential which is a harmonic of the potential of said alternating current circuit, and means for limiting the flow of current from said source of harmonic potential except during the commutation period.

3. In combination, a supply circuit, a load circuit, one of said circuits being an alternating current circuit, means for transmitting energy between said circuits comprising a plurality of electric discharge valves and a transformer associated therewith, means for commutating the current between said electric discharge valves including a source of potential which is a harmonic of the potential of said alternating current circuit, and means including a pair of transformers for maintaining the current at a minimum value except during the commutation period.

4. In an electric translating system for transferring energy between a plurality of electric circuits, a plurality of electric discharge valves, a transformer having a pair of $n$-phase windings connected to said valves, a pair of transformers having their primary windings connected in series and their secondary windings connected in parallel, each of said secondary windings being connected in series with one of said $n$-phase winding sections, and means for supplying a commutating potential to said series connected primary windings.

5. In an electric valve converting apparatus, a supply circuit, a load circuit, one of said circuits being an alternating current circuit, means for transmitting electrical energy between said circuits comprising a transformer having a pair of Y-connected secondary windings each provided with neutral terminals and a plurality of electric discharge valves associated therewith, a pair of transformers having primary and secondary windings, said primary windings being connected in series relation and energized from a source of potential which is a harmonic of the potential of said alternating current circuit, the secondary winding of one of said transformers being connected to the neutral of one of said Y-connected windings while the secondary winding of the other transformer is connected to the neutral of the other Y-connected winding.

6. In combination, a supply circuit, a load circuit, one of said circuits being an alternating current circuit, means for transmitting energy between said circuits comprising a plurality of electric discharge valves and a transformer associated therewith, means for commutating the current between said electric discharge valves including a source of potential which is a harmonic of the potential of said alternating current circuit, and means for improving the wave form of said alternating current comprising means for maintaining the current flowing from said source of harmonic potential at a minimum value except during the commutating period.

7. In an electric valve converting apparatus, a supply circuit, a load circuit, one of said circuits being an alternating current circuit, means for transmitting electrical energy between said circuits comprising a transformer having a pair of Y-connected secondary windings each provided with neutral terminals and a plurality of electric discharge valves associated therewith, means for commutating the current between said electric discharge valves including a source of potential which is a harmonic of the potential of said alternating current circuit, and means including a pair of transformers for maintaining the current flowing from said source of harmonic potential at a minimum value except during the commutation period.

8. In combination a supply circuit, a load circuit, one of said circuits being an alternating current circuit, means for transmitting energy between said circuits comprising a plurality of electric discharge valves and a transformer associated therewith, means for commutating the current between said electric discharge valves including a source of potential which is a harmonic of the potential of said alternating current circuit, and means for limiting the flow of current from said source of harmonic potential while at the same time providing substantially the full voltage of said harmonic source for commutating purposes.

CARL C. HERSKIND.